S. B. HUTCHINS.
Steam Register.
No. 8,131.
Patented June 3, 1851.
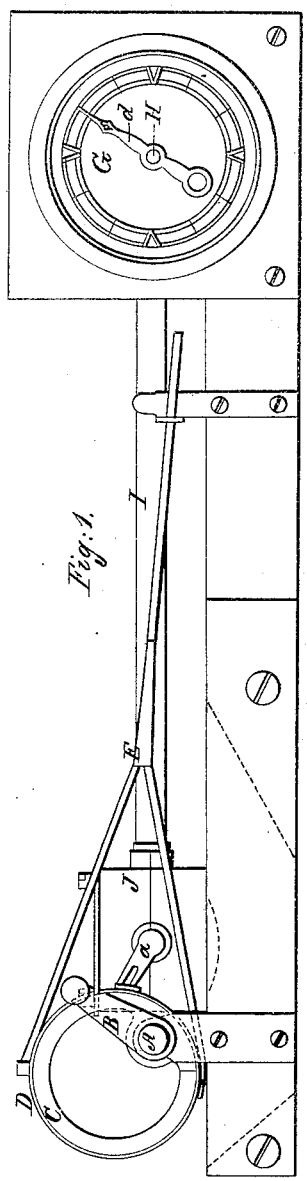
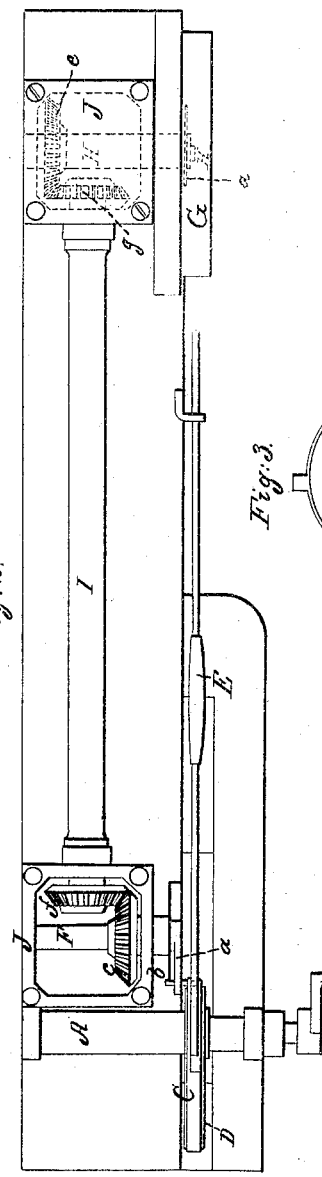
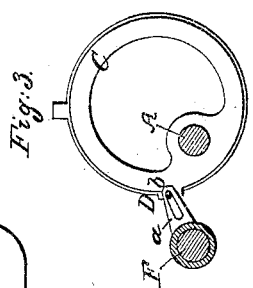

UNITED STATES PATENT OFFICE.

SAMUEL B. HUTCHINS, OF OSWEGATCHIE, NEW YORK.

ARRANGEMENT OF MACHINERY FOR ACTUATING CRANK-INDICATORS.

Specification of Letters Patent No. 8,131, dated June 3, 1851.

*To all whom it may concern:*

Be it known that I, SAMUEL B. HUTCHINS, of Oswegatchie, in the county of St. Lawrence and State of New York, have invented a new and useful improvement in the manner of communicating motion to the indicator attached to a steamboat-engine or to any other engine, for the purpose of rendering the precise position of the crank visible to the engineer or attendant in the engine-room; and I do hereby declare that the following is a full, clear, and exact description of the same, reference being had to the accompanying drawings forming part of this specification, in which—

Figure 1, is a side elevation of a portion of a steamboat engine having its indicator worked in my improved manner. Fig. 2, is a plan of the same. Fig. 3, is a detached view of the parts which produce the motion of the indicator.

Similar letters of reference indicate corresponding parts in each of the several figures.

My invention consists in communicating motion to the indicator hand from a pin secured in the band or rod of the eccentric which works the valves; the said pin acting upon a small crank and giving a rotary motion to the spindle upon which it is secured, and to a small bevel wheel upon the spindle, which gears into another small bevel wheel on another spindle which by means of another bevel wheel gearing into one on the spindle carrying the indicator hand gives the hand a rotary motion corresponding with that of the crank of the engine.

To enable others skilled in the art to make and use my invention I will proceed to describe its construction and operation.

A, is the main shaft of the engine, B, is the crank, C, is the eccentric which works the valves. D, the band encircling the eccentric and having the eccentric rod E, attached to it.

G, represents the dial of the indicator, H, is the spindle which carries the indicator hand $d$, F, is a spindle made of very small steel, or iron rod, it is hung in suitable bearings parallel with and at a short distance from the main shaft A, and carries a small crank $a$, at one end. A small stud $b$, secured in one side of the eccentric band D, fits and works in a slot in the crank $a$, and by the motion of the eccentric is made to give a rotary motion to the small spindle F, which carries the bevel wheel $c$.

I, is the spindle which transmits the motion from the spindle F, to the spindle H, of the indication hand, it is placed at right angles to the other spindles, carrying a bevel wheel $f$, at one end gearing into $c$, and another $g$, at the opposite end, gearing into one $e$, on the spindle H. All the bevel wheels or each pair gearing together must be of the same size; they are encased by boxes J, which protect them from dirt or injury, the cover of one of the boxes is supposed to be removed in Fig. 2 to show the wheels inside.

Every revolution of the main shaft of the engine causes the spindle F, and consequently those I, and H, to make a corresponding revolution, and the indicator $d$, being secured on its spindle in the same position as the engine crank, will always maintain it, and show its precise position in the engine room, where the crank itself may not be visible.

The arrangement of gearing above described is that suitable for driving the indicator when placed at the side of the engine room but by an additional shaft and pair of bevel wheels it may be made to operate in front of the engine. This mode of communicating motion to the indicator possesses many advantages over all others. In the first place the expense of constructing the mechanism employed is small. In the second, it occupies so little room the spindles not being necessarily more than three-eighths ($\frac{3}{8}$) of an inch in diameter, and the wheels not over an inch and a quarter. In the third, it is so perfectly accurate as the several parts are not liable to become deranged. In the fourth, it performs its operation without the slightest noise.

What I claim as my invention and desire to secure by Letters Patent, is—

The arrangement of bevel wheels $c$, $f$, $g$, $e$, and their shafts F, I, H, herein represented and described, the first $c$, in the series being actuated by a motion derived from the eccentric by means of a crank $a$, and pin $b$, and the last $e$, giving motion to the indicator hand, the whole being constructed in the manner and for the purposes herein set forth.

SAMUEL B. HUTCHINS.

Witnesses:
 HORATIO N. THROOP,
 H. McKAY.